No. 753,867. PATENTED MAR. 8, 1904.
D. FORD.
SLIDING CHORD BAR FOR AUTOHARPS.
APPLICATION FILED DEC. 3, 1903.
NO MODEL.
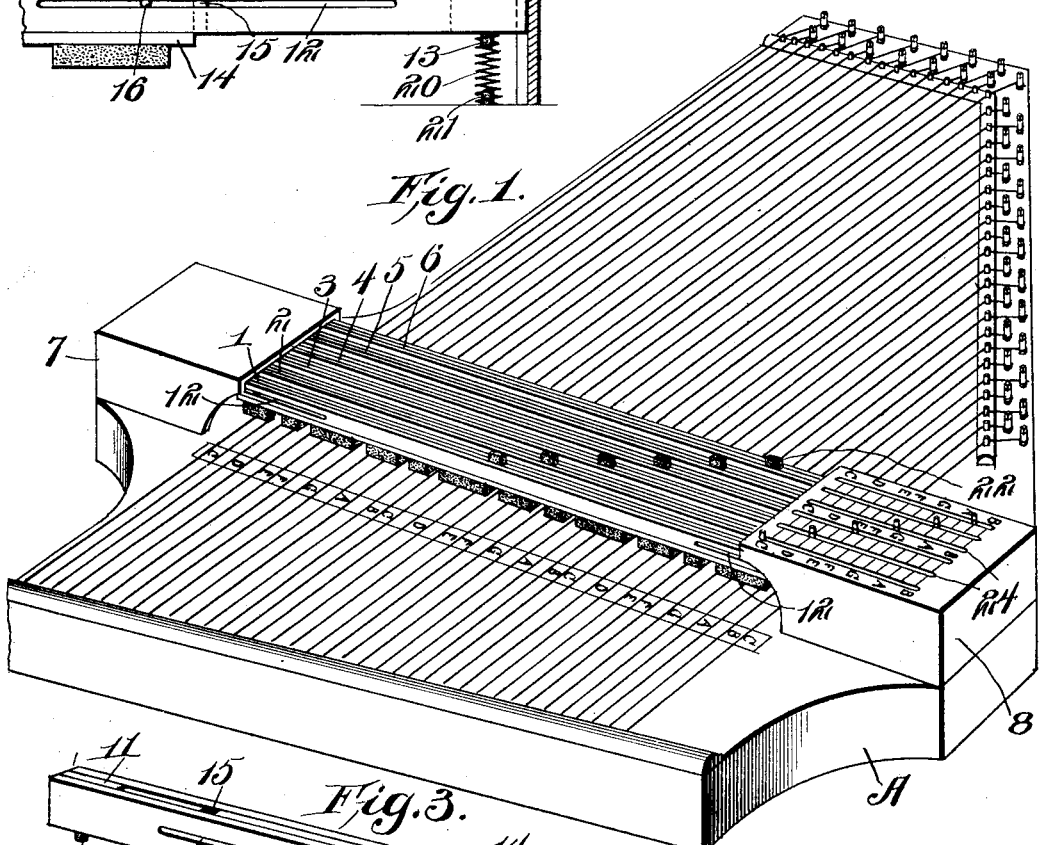
Darden Ford, Inventor.
Witnesses No. 753,867. Patented March 8, 1904.

UNITED STATES PATENT OFFICE.

DARDEN FORD, OF HOMER, LOUISIANA.

SLIDING CHORD-BAR FOR AUTOHARPS.

SPECIFICATION forming part of Letters Patent No. 753,867, dated March 8, 1904.

Application filed December 3, 1903. Serial No. 183,630. (No model.)

*To all whom it may concern:*

Be it known that I, DARDEN FORD, a citizen of the United States, residing at Homer, in the parish of Claiborne and State of Louisiana, have invented a new and useful Sliding Chord-Bar for Autoharps, of which the following is a specification.

This invention relates to sliding chord-bars applicable to chromatically strung and tuned instruments, such as autoharps, zithers, dulcimers, and others of similar character.

The object of the invention is to provide an improved device of the character specified by means of which a great variety of chords and combinations thereof may be produced easily and without the operation of a large number of finger-pieces.

A further object of the invention is to improve the construction of a device of the character specified by making the shifting of the movable members easier, eliminating unnecessary elements, providing an improved form of indicator to show the proper position of the bar to obtain a certain chord, and to make the device noiseless in operation.

With the objects above mentioned and others in view, which will appear as the invention is more fully disclosed, the same consists in the novel construction and combination of parts of sliding chord-bars hereinafter fully described, illustrated in the accompanying drawings, and having the novel features thereof particularly pointed out in the appended claims.

In the drawings, Figure 1 is a perspective view of an autoharp embodying the invention. Fig. 2 is a detail sectional view taken longitudinally and through one end of the damping-bar. Fig. 3 is a detail perspective view, partly broken away, of one of the members of the damping-bar and its support. Fig. 4 is a similar view of one end of a member of the damping-bar.

In the drawings, 1, 2, 3, 4, 5, and 6 designate generally a plurality of bars, each arranged for the production of chords of a particular kind and comprising, collectively, the sliding chord-bars of the present invention. The bars 1, 2, 3, 4, 5, and 6 are secured upon any chromatically strung and tuned instruments of suitable size, as the autoharp A, by means of casings 7 and 8, the latter being provided on its upper surface with an indicating device, as shown. Each of the bars 1, 2, 3, 4, 5, and 6 consists of a frame comprising longitudinal members 10, spaced apart by means of spacing-blocks 11, placed between the members at their ends and leaving a guideway between the members 10 throughout the greater portion of their length. The members 10 are both provided near their ends with narrow slots 12, extending longitudinally, as shown, and pegs 13, of felt, are provided on the under surface of the spacing-blocks 11. In the guideway formed between the longitudinal members 10 of each bar there is arranged a sliding bar 14 of inverted-T shape in cross-section provided at its ends with small felt buffers 15 to deaden the noise of contact when one end of the member 14 strikes against one of the spacing-blocks 11. The member 14 of each bar is arranged for longitudinal sliding movement between the members 10 and is prevented from removal from between the members 10 by short members 16, extending transversely through the member 14 and engaging the slots 12, formed in the members 10. These short members 16 also serve as guides for the movement of the member 14 between the members 10. On the under surface of each member 14 there are provided a plurality of pads of felt. These pads are of suitable proportions to damp certain strings when the chord-bar is brought down upon the strings of the instrument, and the exact proportions of the pads on each bar will vary. The arrangement of the different pads is that necessary in each case to produce chords of the character desired and forms no part of the present invention. Hence it is regarded as unnecessary to illustrate in detail the arrangement of the pads upon each bar. Each of the bars is arranged for vertical movement in guides formed in the casings 7 and 8, and springs 20 are disposed between the bottoms of said casings and the bars to hold them normally elevated and out of contact with the strings of the instrument. The springs 20 have their lower ends fitted over studs 21, of felt, provided for that purpose, and their upper ends encircle the pegs 13, of felt, provided on the under side of the spacing-blocks 11.

In order to move the members 14 between the members 10 for the purpose above explained, each member 14 is provided with a thumb-piece 22 substantially midway between the ends of the member. Near the right end of each member 14 there is provided an upwardly-projecting pin 23, which serves, together with the characters marked on the upper surface of the casing 8, to indicate the proper position of the bar for the production of a chord in any key. The casing 8 is provided on its upper surface with a plurality of slots 24, through which the pins 23 project, and on the surface between the slots 24 are provided the characters representing the tones of the chromatic scale, these characters corresponding, of course, to the strings comprising an octave upon the instrument.

The chords produced by means of the several bars are those preferably used in playing the instrument for which the sliding chord-bars are designed, and the arrangement of the pads of felt upon the members 14 to act as dampers will accordingly be varied to suit the requirements of different instruments.

As shown in Fig. 1, each chord-bar is arranged transversely over the strings of the instrument of the above character, and the springs keep the felt dampers out of contact with the strings. When, however, it is desired to produce a chord of any kind, the bar provided with dampers arranged for the production of that particular chord may be depressed and the dampers will press upon and muffle or damp the resonance of all strings except those in the two registers adapted to harmonize in the production of the desired chord. The key in which the chord is produced will be determined by the position of the pin 23 with reference to the characters adjacent to the slot 24 in the casing 8, in which the pin 23 moves. By sliding the member 14 from one extreme position to the other it will be caused to pass through the position in which it must be placed to produce a chord in any key of the whole chromatic scale. Consequently to produce a given chord in any desired key the musician must first select the chord-bar necessary for the production of a chord of the desired kind and then shift the member 14, if necessary, to bring the pin 23, carried thereby, opposite the character upon the casing 8 representing the "root-name" of the key in which the chord is to be produced. The member 14 having been brought into the desired position, the whole bar will be depressed to bring the felt dampers into contact with the strings, and then upon striking the strings of the instrument the desired chord will be produced. It will thus be seen that each of the six bars 1, 2, 3, 4, 5, and 6 is capable of producing chords in all the keys, and it is only necessary to shift the member 14 of the bar into such position that the pin 23 corresponds to the character representing the key upon the upper surface of the casing 8 to insure the production of the chord in the desired key when the bar is depressed. As there are twelve strings for each octave upon the instrument and in order to produce chords in all the keys possible it is necessary to provide for the movement of the member 14 through the space occupied by the entire octave, the slots 12 and 24 must be of a length corresponding to the distance from the first string of an octave to the last. Thus if the strings of the instrument are one-fourth of an inch apart the slots 12 and 24 must be two and three-fourths inches in length and the members 10 must be of enough greater length than each member 14 to permit the member 14 of each bar to have a longitudinal play of two and three-fourths inches.

In the use of the invention the production of single chords is brought about in the manner already explained, and for the production of combinations of chords a plurality of the chord-bars are simultaneously brought into play. If it is desired to limit the chord to either the upper or lower register, instead of depressing one of the chord-bars as an entirety pressure may be applied to either end of the bar and its effect be so limited to the upper or lower register as the pressure is applied to the right or left end of the bar. If, therefore, it is desired to produce in combination the tones of one chord in the upper register and the tones of another chord in the lower register, one of the bars may be depressed at one end to damp strings in the upper register and another bar depressed at the other end to produce the tones desired in the lower register. Similarly if it is desired to produce in combination with the tones of a certain chord in one register one or more tones of another chord in the other register the proper chord-bar will be depressed at one end to produce the chord in the appropriate register, and the other chord-bar required will be sufficiently depressed at the other end to effect a partial damping of the strings in the other register.

From the foregoing description and the drawings illustrative thereof it will be seen that by means of a comparatively simple structure it is possible to produce a great variety of different chords and combinations of chords and parts of chords. The operation of the chord-bars is rendered noiseless by means of the felt buffers at the ends of the members 14, and the use of felt studs and pegs to hold the springs in proper relative position and the exposure of the upper surface of the several chord-bars throughout nearly their entire length renders the depression of the bars by pressure at practically any point between their ends possible.

In the construction of the chord-bars any suitable material may be employed; but light well-seasoned wood is to be preferred for members 10 and 14 and thin sheet metal is preferable for the construction of the casings 7 and 8, which should of course be lined with felt to deaden the sound of contact of the bars therewith.

While I have described the preferred form of embodiment of the invention, it will be obvious that changes as to details of construction may be resorted to without departing from the spirit of the invention.

Having thus described the construction and operation of my invention, what I claim as new, and desire to secure by Letters Patent, is—

1. The combination with a chromatically strung and tuned musical instrument, of casings having vertically-arranged guideways therein, said casings being arranged at opposite sides of the sounding-board of the instrument, a plurality of chord-bars arranged for vertical movement in the ways in said casings and each comprising a frame and a member arranged for longitudinal sliding movement therein, springs by which said chord-bars are held normally out of contact with the strings of the instrument, connecting devices by means of which the positions of the longitudinal sliding members relative to the spring are rendered clearly visible, said connecting devices comprising upwardly-projecting pins provided one on each of said sliding members, and a slotted cover-plate for one of said casings, said cover-plate having scales arranged between the slots thereof and the pins on the longitudinal sliding members being disposed in said slots.

2. A chord-bar for chromatically strung and tuned musical instruments comprising a frame adapted to be supported transversely of the instrument above the strings, felt pegs on the under side of said frame, springs encircling said pegs and having their lower ends fixed in position, and a sliding member arranged for movement longitudinally in said frame, said sliding member being provided at its ends with sound-deadening buffers and having blocks of felt secured upon the under side thereof for engagement with certain strings of the instrument for the production of a particular chord.

3. In a chord-bar for musical instruments, the combination of a frame consisting of two longitudinal members spaced apart and provided near their ends with longitudinally-disposed slots, means for yieldably supporting said frame above the strings of a musical instrument, a member arranged for sliding movement in said frame and being of an inverted-T shape in cross-section, pins fixed in said member and engaging the slots in said frame, and buffers at the ends of said sliding member.

In testimony that I claim the foregoing as my own I have hereto affixed my signature in the presence of two witnesses.

DARDEN FORD.

Witnesses:
H. L. GREER,
B. H. MOORE.